(12) United States Patent
Balasubramanian et al.

(10) Patent No.: US 8,516,101 B2
(45) Date of Patent: Aug. 20, 2013

(54) RESOURCE MANAGEMENT FOR A WIRELESS DEVICE

(75) Inventors: Srinivasan Balasubramanian, San Diego, CA (US); Ajith T. Payyappilly, San Diego, CA (US); Reza Shahidi, San Diego, CA (US); Kevin S. Seltmann, Vista, CA (US); Suli Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 12/708,319

(22) Filed: Feb. 18, 2010

(65) Prior Publication Data

US 2010/0318660 A1    Dec. 16, 2010

Related U.S. Application Data

(60) Provisional application No. 61/187,082, filed on Jun. 15, 2009.

(51) Int. Cl.
*G06F 15/173* (2006.01)

(52) U.S. Cl.
USPC .................. 709/223; 709/224; 370/395.21

(58) Field of Classification Search
USPC .............. 709/223–229; 370/329, 395.21, 370/395.42; 455/436, 450, 451, 452, 452.2, 455/453
See application file for complete search history.

(56) References Cited

U.S. PATENT DOCUMENTS

| 8,331,377 B2 | 12/2012 | Attar et al. | |
| 2002/0186657 A1* | 12/2002 | Jain et al. | 370/235 |
| 2003/0016628 A1 | 1/2003 | Kadambi et al. | |
| 2003/0055980 A1* | 3/2003 | Liu et al. | 709/227 |
| 2003/0073424 A1* | 4/2003 | Nunally | 455/404 |
| 2004/0128379 A1 | 7/2004 | Mizell et al. | |
| 2006/0203724 A1 | 9/2006 | Ghosh et al. | |
| 2007/0070952 A1* | 3/2007 | Yoon et al. | 370/334 |

(Continued)

FOREIGN PATENT DOCUMENTS

| JP | 2005244505 A | 9/2005 |
| WO | WO02093946 A2 | 11/2002 |
| WO | 2006096789 A1 | 9/2006 |
| WO | WO2008042813 | 4/2008 |

OTHER PUBLICATIONS

International Search Report and Written Opinion—PCT/US2010/038735, International Search Authority—European Patent Office—Mar. 9, 2011.
Taiwan Search Report—TW099119521—TIPO—May 21, 2013.

*Primary Examiner* — LaShonda Jacobs
(74) *Attorney, Agent, or Firm* — Kevin T. Cheatham

(57) ABSTRACT

Techniques for managing resources on a wireless device are described. In an aspect, congestion of resources on the wireless device may be detected. If any resources are deemed to be congested, then congestion of the congested resources may be relieved by controlling utilization of the congested resources by at least one client. In one design, flow control may be performed for at least one data flow to relieve congestion of the congested resources. A pattern indicative of when to send messages enabling data transmission and when to send messages disabling data transmission may be selected. Messages may then be sent in accordance with the pattern to control transmission of data for the at least one data flow. Another pattern with a higher ON fraction or a lower ON fraction may be selected based on usage of the congested resources.

21 Claims, 6 Drawing Sheets

(56) References Cited

U.S. PATENT DOCUMENTS

| | | | |
|---|---|---|---|
| 2008/0020780 A1* | 1/2008 | Hanov et al. | 455/452.2 |
| 2008/0043648 A1* | 2/2008 | Buga et al. | 370/310 |
| 2008/0085717 A1* | 4/2008 | Chhabra et al. | 455/450 |
| 2008/0279183 A1 | 11/2008 | Wiley et al. | |
| 2009/0271101 A1* | 10/2009 | Relyea et al. | 701/118 |
| 2010/0015926 A1* | 1/2010 | Luff | 455/67.13 |
| 2010/0113037 A1* | 5/2010 | Ong et al. | 455/445 |

* cited by examiner

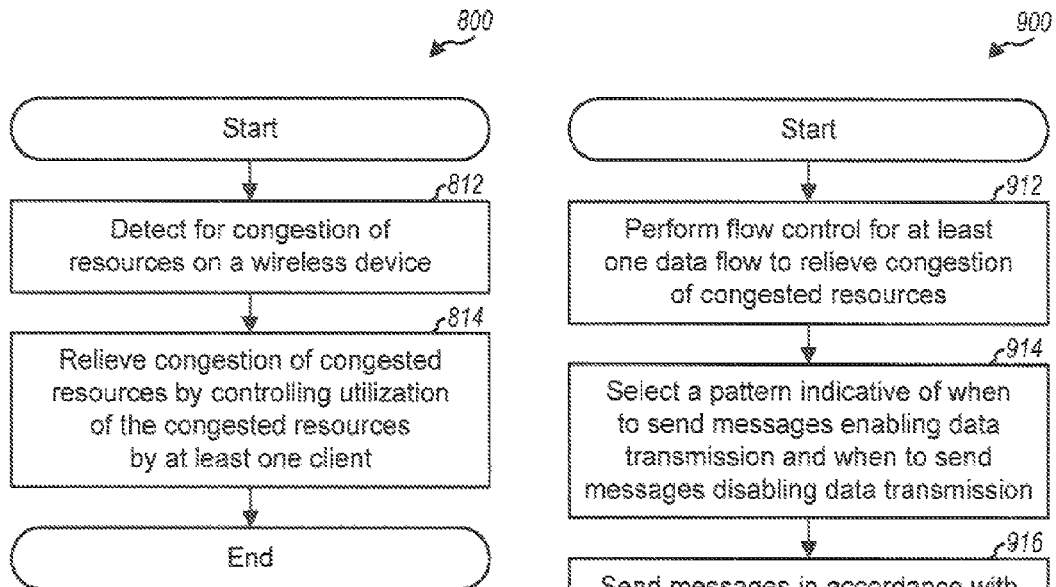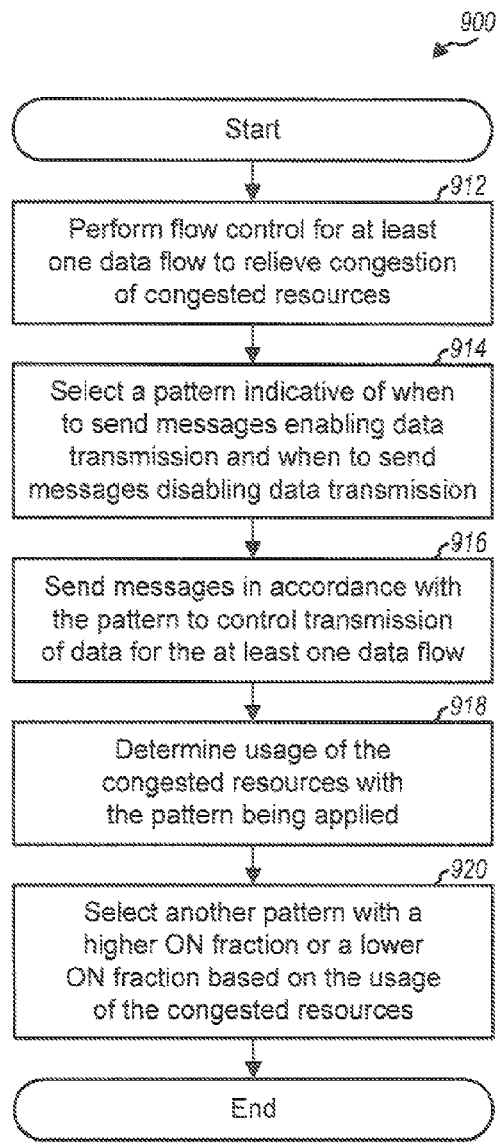

RESOURCE MANAGEMENT FOR A WIRELESS DEVICE

The present application claims priority to provisional U.S. Application Ser. No. 61/187,082, entitled "METHOD AND APPARATUS FOR FLOW CONTROL ON A WIRELESS COMMUNICATIONS LINK," filed Jun. 15, 2009, assigned to the assignee hereof and incorporated herein by reference.

BACKGROUND

I. Field

The present disclosure relates generally to electronics, and more specifically to techniques for managing resources on a wireless device.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc.

A wireless device (e.g., a cellular phone) may actively communicate with a wireless network for one or more services, e.g., voice and/or packet data. The wireless device may expend resources to process data for communication with the wireless network. The amount of resources used by the wireless device may fluctuate widely over time and may be dependent on the number of services being obtained, the amount of data being exchanged with the wireless network, etc. If the required resources exceed the available resources on the wireless device, then certain adverse effects may result, which may then cause poor user experience. For example, packets may be dropped and/or services may encounter poor performance due to insufficient resources on the wireless device.

There is therefore a need in the art for techniques to mitigate adverse effects due to insufficient resources on a wireless device.

SUMMARY

Techniques for managing resources on a wireless device are described herein. The resources on the wireless device may include central processing unit (CPU) resources, memory resources, bus resources, power resources, and/or other resources.

In an aspect, congestion of resources on the wireless device may be detected. Congestion is a condition in which available resources on the wireless device may be insufficient to meet demand. In one design, usage reports for different resources may be received, e.g., periodically, when triggered, when requested, etc. Congestion of resources on the wireless device may then be detected based on the usage reports. For example, CPU resources may be deemed to be congested if usage of a processor exceeds a high threshold. If any resources are deemed to be congested, then congestion of the congested resources may be relieved by controlling utilization of the congested resources by at least one client. The at least one client may include a forward link flow controller, a reverse link flow controller, and/or other clients for other functions on the wireless device.

In one design, flow control may be performed for at least one data flow to relieve congestion of the congested resources. A pattern indicative of when to send messages to enable data transmission and when to send messages to disable data transmission may be selected. Messages may then be sent in accordance with the pattern to control transmission of data for the at least one data flow. A set of patterns associated with different ON fractions or bandwidths may be supported. Usage of the congested resources may be monitored. Another pattern with a higher ON fraction or a lower ON fraction may be selected based on the usage of the congested resources.

The wireless device may support operation on multiple carriers. In this case, at least one carrier used for data transmission may be dropped to relieve congestion of the congested resources. The at least one carrier may be restored if usage of the congested resources is below a threshold.

Various aspects and features of the disclosure are described in further detail below.

BRIEF DESCRIPTION OF THE DRAWINGS

FIG. 8 shows a process for managing resources on a wireless device.

FIG. 9 shows a process for performing flow control to relieve congestion.

DETAILED DESCRIPTION

The techniques described herein may be used for various wireless communication networks such as CDMA networks, TDMA networks, FDMA networks, OFDMA networks, SC-FDMA networks, wireless local area networks (WLANs), and other networks. The terms "network" and "system" are often used interchangeably. A CDMA network may implement a radio access technology (RAT) such as Universal Terrestrial Radio Access (UTRA), cdma2000, etc. UTRA includes Wideband CDMA (WCDMA) and other variants of CDMA. cdma2000 covers CDMA 1× and High Rate Packet Data (HRPD). A TDMA network may implement a RAT such as Global System for Mobile Communications (GSM). An OFDMA network may implement a RAT such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a RAT such as IEEE 802.11, Hiperlan, etc. The techniques described herein may be used for the wireless networks and RATs mentioned above as well as other wireless networks and RATs. For clarity, certain aspects of the techniques are described below for HRPD, and HRPD terminology is used in much of the description below.

Figure 1:
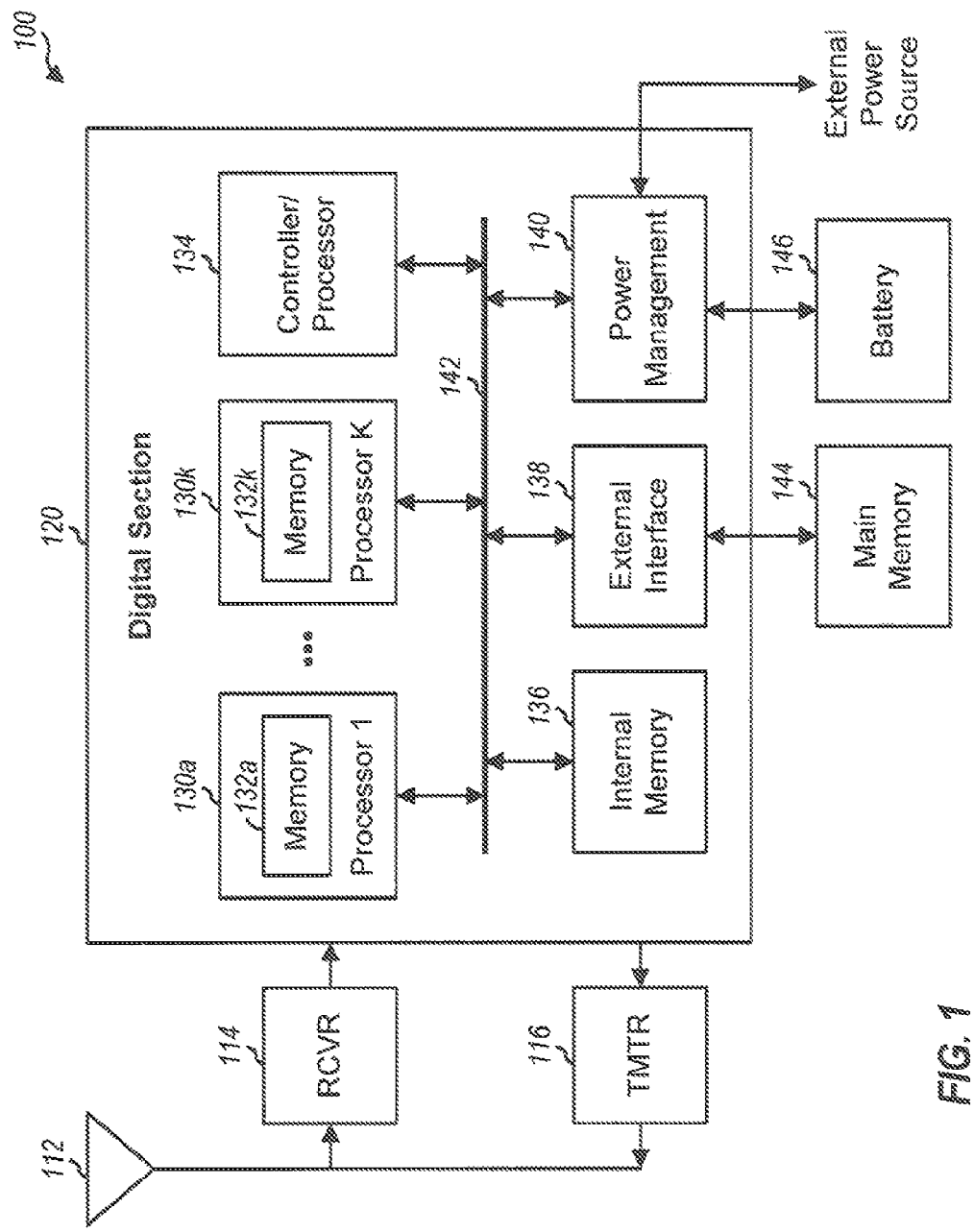
FIG. 1 shows a block diagram of a wireless device.

FIG. 1 shows a block diagram of a design of a wireless device 100 in a wireless communication network. Wireless device 100 may also be referred to as a user equipment (UE), a mobile station, a terminal, an access terminal, a mobile equipment, a subscriber unit, a station, etc. Wireless device 100 may be a cellular phone, a personal digital assistant (PDA), a wireless modem, a handheld device, a laptop computer, etc.

In the receive path, an antenna 112 may receive signals transmitted by base stations and/or other transmitter stations and may provide a received signal to a receiver (RCVR) 114. Receiver 114 may process (e.g., filter, amplify, frequency downconvert, and digitize) the received signal and provide input samples to a digital section 120 for further processing. In the transmit path, digital section 120 may process data to be transmitted and provide output samples to a transmitter (TMTR) 116. Transmitter 116 may process (e.g., convert to analog, filter, amplify, and frequency upconvert) the output samples and generate a reverse link signal, which may be transmitted via antenna 112.

Digital section 120 may include various processing, memory, and interface units that may support radio communication as well as various applications. In the design shown in FIG. 1, digital section 120 may include K processors 130a through 130k, where K may be one or greater, a controller/processor 134, an internal memory 136, an external interface 138, and a power management unit 140, all of which may be coupled to a bus 142. Each processor 130 may comprise one or more CPUs, digital signal processors (DSPs), reduced instruction set computer (RISC) processors, general-purpose processors, etc. Each processor 130 may also include an internal memory 132. Processors 130a through 130k may perform processing for data transmission (e.g., encoding and modulation), processing for data reception (e.g., demodulation and decoding), higher-layer processing for data exchanged with a wireless network, processing for various applications, etc.

Controller/processor 134 may direct the operation at wireless device 100 and/or may perform other functions. Memory 136 may store data and/or instructions for various units within digital section 120. Interface unit 138 may interface with other units such as a main memory 144, input/output (I/O) devices, etc. Power management unit 140 may manage battery power for wireless device 100 and may be coupled to a battery 146 and an external power source. Digital section 120 may be implemented on one or more application specific integrated circuits (ASICs) and/or other integrated circuits (ICs).

In general, wireless device 100 may include fewer, more and/or different processing, memory, and interface units than those shown in FIG. 1. The number of processors and memories and the types of processors included in digital section 120 may be dependent on various factors such as the communication networks and applications supported by wireless device 100, cost and power considerations, etc.

Wireless device 100 may support various applications. An application may be a software and/or firmware module that performs a particular function. Different applications may be used to support communication via different RATs, to support different services, etc. For example, wireless device 100 may support applications for voice, packet data, video, video telephony (VT), web browser, email, text editor, video games, WLAN, Bluetooth, assisted Global Positioning System (A-GPS), etc.

Wireless device 100 may have one or more data flows for all of the active applications. A data flow may be a stream of data between two specific end points. A data flow may also be referred to as an Internet Protocol (IP) flow, a Radio Link Control (RLC) flow, a Radio Link Protocol (RLP) flow, etc. Different types of data flows may be used for different traffic classes, different quality-of-service (QoS) classes, etc. Each data flow type may or may not be associated with QoS requirements. Table 1 lists some types of data flows and provides a short description for each data flow type.

TABLE 1

Data Flows

| Data Flow Type | Name | Description |
| --- | --- | --- |
| Expedited-Forwarding Data Flow | EF Flow | A data flow with delay bounds. |
| Assured-Forwarding Data Flow | AF Flow | A data flow with average throughput requirements. |
| Best Effort Data Flow | BE Flow | A data flow with no delay bound or throughput requirements. |

As shown in Table 1, QoS requirements may be quantified by two QoS parameters—delay bound and average throughput. Average throughput may also be referred to as required throughput, required rate, etc. QoS requirements may also be quantified by other parameters such as peak throughput, packet error rate (PER), etc. A QoS flow is a data flow having at least one QoS requirement, e.g., delay bound and/or required throughput. EF flows and AF flows have QoS requirements and are two types of QoS flows. BE flows have no QoS requirements and are non-QoS flows. An example of an EF flow is a Voice-over-IP (VoIP) flow. An example of an AF flow is a streaming video flow. An example of a BE flow is a data flow for data download.

Wireless device 100 may have various types of resources that may be used to support all of the applications running on the wireless device. The resources on wireless device 100 may be categorized as shown in Table 2.

TABLE 2

Resources

| Resources | Description |
| --- | --- |
| CPU resources | Resources to perform processing, e.g., processors 130 |
| Memory resources | Resources to store data, e.g., memories 132, 136 and 144 |
| Bus resources | Resources to transfer data, e.g., bus 142 |
| Battery resources | Resources to power wireless device 100, e.g., battery 146 |

The resources on wireless device 100 may be configurable. For example, the CPU resources may be varied by adjusting the clock frequency of processors 130. The bus resources may be varied by adjusting the clock frequency of bus 142. Higher clock frequencies for processors 130 and bus 142 may provide more CPU and bus resources but may also result in higher power consumption, which may shorten battery life of wireless device 100. In general, it may be desirable to operate at the lowest CPU and bus clock frequencies that can provide sufficient CPU and bus resources to meet the demands of all active applications, so that power consumption can be minimized.

Wireless device 110 may have a limited amount of resources. The available resources on wireless device 110 may be insufficient to meet the demands of all applications running on wireless device 110. Wireless device 110 may perform resource management to mitigate adverse effects due to insufficient resources on wireless device 110.

Figure 2:
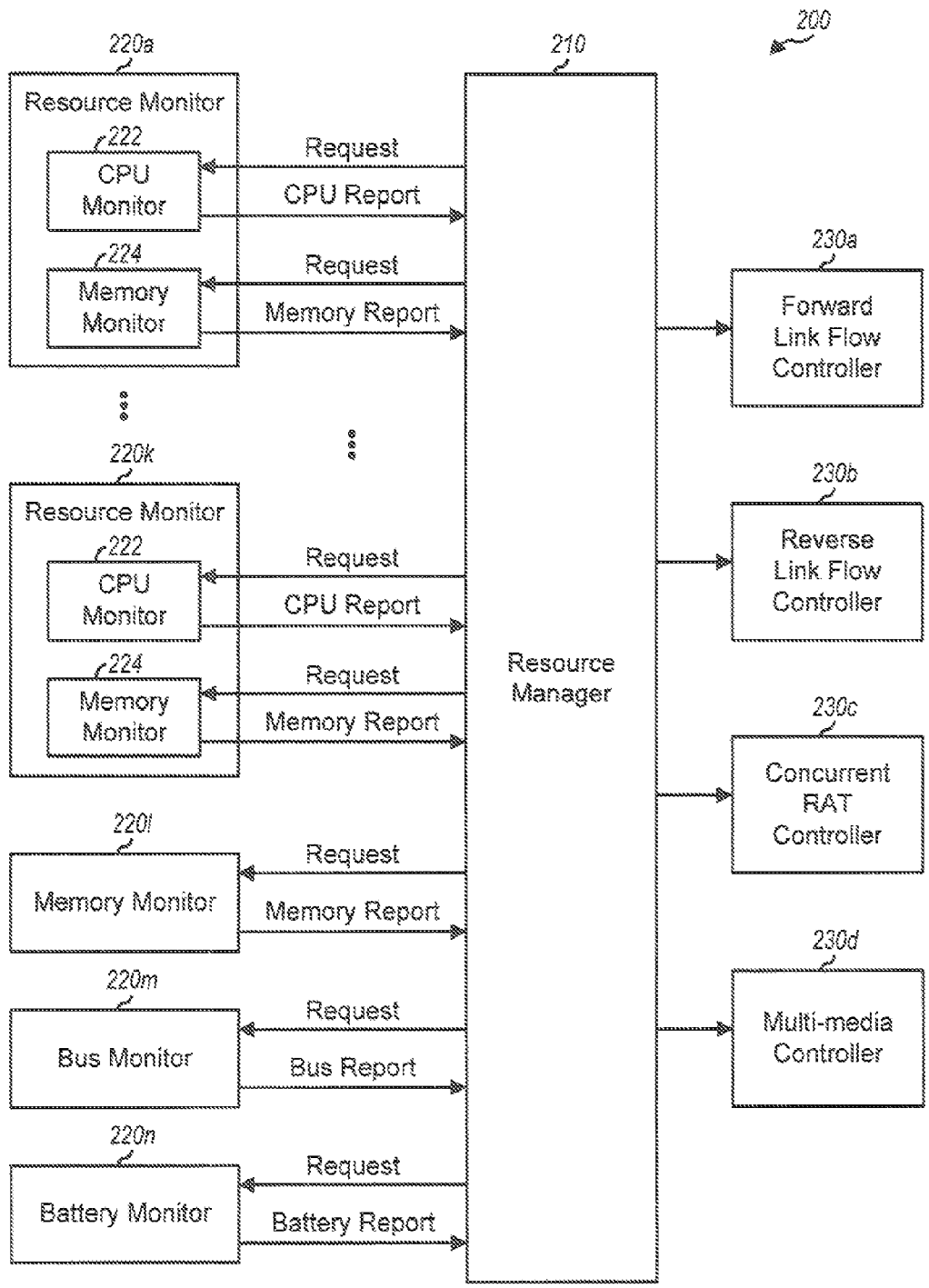
FIG. 2 shows a block diagram of a resource management system.

FIG. 2 shows a block diagram of a design of a resource management system 200 for wireless device 100. In this design, system 200 includes a resource manager 210, a set of resource monitors 220, and a set of client controllers 230. Resource manager 210, resource monitors 220, and client controllers 230 may be part of controller/processor 134 in FIG. 1 or may be distributed throughout different parts of wireless device 100. For example, processors 130a through 130k may include resource monitors 220a through 220k, respectively.

Resource monitors 220a through 220k may monitor CPU and memory resources of processors 130a through 130k, respectively. Resource monitors 220a through 220k may each include a CPU monitor 222 and a memory monitor 224. CPU monitor 222 for each processor 130 may determine CPU usage of the associated processor 130. CPU usage may be given by the percentage of time that the associated processor 130 is used during a measurement interval and may be computed based on a ratio of the number of active clock cycles to the total number of clock cycles in the measurement interval. The measurement interval may be selected to provide sufficient averaging as well as to reduce delay in obtaining reports of CPU usage. The measurement interval may be 250 milliseconds (ms) or some other duration. Memory monitor 224 for each processor 130 may determine memory usage of the associated processor 130. Memory usage may be given by the percentage of memory resources in the associated processor 130 being used. Memory monitor 220l may determine usage of internal memory 136 and/or main memory 144. Bus monitor 220m may determine usage of bus 142. Battery monitor 220n may determine available battery power of battery 146.

Client controllers 230a through 230d may control different clients, which may support active applications and other functions. Client controller 230a may be a forward link flow controller that may control one or more data flows carrying data on the forward link for active applications. Client controller 230b may be a reverse link flow controller that may control one or more data flows carrying data on the reverse link for active applications. Client controller 230c may control concurrent operation of multiple RATs. Client controller 230d may control multi-media functions for active applications.

FIG. 2 shows some exemplary resource monitors and some exemplary client controllers. Resource management system 200 may also include different and/or additional resource monitors that can monitor other types of resources. System 200 may also include different and/or additional client controllers that can control other types of clients. For example, system 200 may include a multiple-application controller that can prioritize applications and enable and disable applications as necessary. As another example, system 200 may include a controller for MP3 player that can pause video playback or display video different quality depending the available resources.

Resource manager 210 may communicate with resource monitors 220 to determine usage of different resources on wireless device 110. Resource manager 210 may detect for congestion of resources on wireless device 110 based on reports from resource monitors 220. Resource manager 210 may relieve congested resources by controlling utilization of the congested resources by one or more clients. For example, a client may control a data flow that carries data for one or more active applications and utilizes the congested resources. Resource manager 210 may perform flow control of the data flow in order to control utilization of the congested resources. Resource manager 210 may arbitrate among different clients and/or different actions in order to relieve congestion.

FIG. 2 shows a centralized design in which a single resource manager 210 may manage different resources on wireless device 110 in a centralized manner and may control different clients. In a distributed design, a resource manager may be present for each type or each group of resources (e.g., each processor 130) to be controlled separately. Resource managers for different resources may communicate with one another to relieve congestion of congested resources. For clarity, much of the description below assumes the centralized design shown in FIG. 2.

Resource monitoring may be performed in various manners. In one design that is shown in FIG. 2, resource usage may be reported on demand. Resource manager 210 may send a request to a resource monitor for certain resources whenever resource manager 210 desires to know the status of these resources. The resource monitor may then return a report indicative of usage of the resources. In another design, resource usage may be reported when triggered. A resource monitor for certain resources may send a report to resource manager 210 whenever a trigger occurs. For periodic reporting, a trigger may occur periodically in each reporting interval, which may be configurable. For event-based reporting, a trigger may occur when certain conditions are satisfied. For example, a trigger may occur whenever resource usage exceeds a high threshold or a low threshold.

A resource monitor may send reports of resource usage in various manners. In one design, a resource monitor may report the percentage of resources being used. In another design, a resource monitor may compare resource usage against a set of thresholds and may report a value based on the comparison result.

Figure 3:
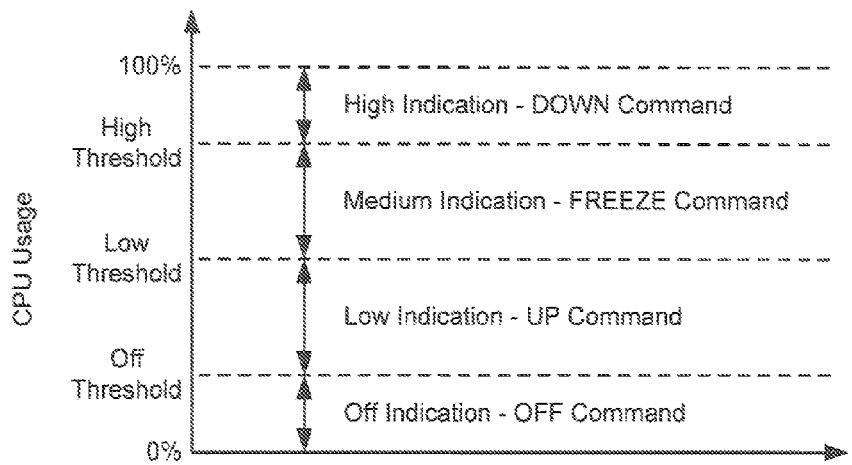
FIG. 3 shows reporting of CPU usage with three thresholds.

FIG. 3 shows a design of reporting CPU usage using three thresholds—a high threshold, a low threshold, and an off threshold. The CPU usage may be in one of four possible ranges defined by the three thresholds. The four ranges may also be referred to as CPU states. A report for CPU usage may include one of the following:

A high indication if CPU usage exceeds the high threshold,

A medium indication if CPU usage is between the low and high thresholds,

A low indication if CPU usage is between the low and off thresholds, or

An off indication if CPU usage is below the off threshold.

As shown in FIG. 3, a high indication may be associated with a DOWN command to reduce CPU usage. A medium indication may be associated with a FREEZE command to maintain CPU usage. A low indication may be associated with an UP command to increase CPU usage. An off indication may be associated with an OFF command to possibly increase CPU usage by a larger amount. These various commands may be used for flow control to relieve congestion, as described below.

The amount of CPU resources available for use may be dependent on the CPU clock frequency. CPU usage may be reported for the current CPU clock frequency. The CPU clock frequency may be varied based on CPU usage. For example, a high indication may result in an increase of the CPU clock frequency, which may result in a lower indication of CPU usage in the next report. Conversely, a low indication may result in a decrease of the CPU clock frequency, which may result in a higher indication of CPU usage in the next report.

Congestion may be declared if a high indication for CPU usage is received and the CPU clock is at the highest frequency. The CPU clock may be maintained as the highest frequency as long as congestion is detected and may be adjusted lower based on CPU usage once congestion is relieved.

For event-based reporting, a report may be sent only when a threshold is crossed or when a state change occurs. For periodic reporting, a report may be sent in each reporting interval and may include one of the indications described above. For on-demand reporting, a report may be sent when requested and may include one of the indications described above.

The high, low, and off thresholds may be set to suitable values. The high threshold may be determined by operating system requirements. The low threshold may have a large impact on CPU utilization and may be set within a suitable range so that CPU usage can be maintained between the low and high thresholds. In one design, the high threshold may be set to a value between 95% and 100%, the low threshold may be set to a value between 70% and 90%, and the off threshold may be set to a value below 50%. The high, low and off thresholds may also be set to other values.

In one design, the same threshold values may be used for all clients. In this design, resource manager 210 may receive CPU usage reports from a resource monitor and may control the clients, as necessary. In another design, different threshold values may be used for different clients. In this design, a resource monitor may generate reports for a given client based on the threshold values applicable for that client. Resource manager 210 may control each client based on the reports received for that client.

FIG. 3 shows an exemplary design with three thresholds for four ranges. Fewer or more thresholds may also be used. For example, two thresholds including a high threshold and a low threshold may be used, and three commands including DOWN, FREEZE and UP commands may be supported. In one design, the same number of thresholds may be used for different resources being monitored. In another design, different numbers of thresholds may be used for different resources. For example, three thresholds may be used for CPU resources, two thresholds may be used for memory resources, etc.

Resource manager 210 may receive reports of resource usage from various resource monitors. Resource manager 210 may detect for congested resources based on the received reports. For example, resource manager 210 may detect congestion of a particular processor 130 if (i) a report with a high indication is received from a CPU monitor for the processor and (ii) the highest clock frequency is used for the processor. If congestion is detected for any resources, then resource manager 210 may take actions to mitigate the congestion. For example, resource manager 210 may initiate flow control for forward link data flows and/or reverse link data flows to maintain CPU usage within a desired range. Resource manager 210 may send directives for flow control to forward link flow controller 230a and/or reverse link flow controller 230b. Resource manager 210 may control client controllers 230 so that no resources are congested.

Wireless device 110 may support high data rate on the forward link and/or the reverse link and may run out of resources (e.g., CPU and/or memory resources). This resource congestion may result in excessive latency in processing packets, overflow of memory, and/or other deleterious effects. For EF flows, excessive latency may cause poor performance. In order to relieve congestion, the rate of data transmission may be reduced by performing flow control.

QoS flows may have higher priority than BE flows, and QoS requirements of the QoS flows may be maintained even when flow control is performed by serving the QoS flows before the BE flows. Furthermore, flow control may be performed in a manner such that sufficient bandwidth is available to adequately serve all QoS flows, so that the QoS requirements of the QoS flows can be maintained.

In one design, congestion may be relieved by performing flow control of one or more data flows sent on the forward link. Flow control may be performed in different manners for different RATs. For clarity, flow control of one or more data flows on the forward link in HRPD is described below.

For HRPD, wireless device 110 may periodically send DRC messages on the reverse link to indicate its capability to receive data on the forward link. Each DRC message may indicate (i) a particular sector from which wireless device 110 desires to receive data from and (ii) a particular data rate that wireless device 110 can support for this sector. The data rate may range from 38.4 Kbps to 2.4576 Mbps for HRPD Revision 0 (or up to 3.1 Mbps for HRPD Revision A or 14.7 Mbps for HRPD Revision B with three carriers), or may be a null rate of 0 Kbps. A DRC message with a null rate is also referred to as a DRC null cover. Wireless device 110 may send a DRC message in each DRC period, which may cover a configurable number of slots (e.g., 1, 2, 4 or 8 slots in HRPD), with each slot covering 1.67 ms.

In one design, wireless device 110 may start sending DRC null covers when resource congestion is detected and may stop sending DRC null covers when congestion is relieved. The DRC null covers would inhibit transmission of data on the forward link to wireless device 110, which may then relieve congestion. This design may relieve congestion but may also introduce transmission discontinuity on the forward link during the time period in which the DRC null covers are sent. The transmission discontinuity may cause unacceptable jitter for EF flows having delay bounds.

In another design, wireless device 110 may send DRC null covers based on a DRC pattern when resource congestion is detected. The DRC pattern may indicate (i) OFF periods when DRC null covers are sent and (ii) ON periods when DRC messages with non-zero data rates are sent. By mixing ON periods with OFF periods, the desired bandwidth on the forward link may be obtained to relieve congestion, and excessive latency may be reduced to avoid unacceptable jitter for EF flows. The DRC pattern may control the forward link bandwidth to a level that can be supported by the resources on wireless device 110. A scheduler on the network side may maintain the priority of QoS flows relative to BE flows even when wireless device 110 reduces the forward link bandwidth due to congestion. The scheduler may send QoS flows ahead of BE flows when there is insufficient bandwidth to transmit both QoS and BE flows.

In one design, a set of DRC patterns may be defined for different levels of bandwidth reduction on the forward link. Each DRC pattern may have a particular ON fraction, which may be defined as follows:

$$\text{ON Fraction} = \frac{\text{ON Periods}}{\text{ON Periods} + \text{OFF Periods}}. \quad \text{Eq (1)}$$

Table 3 lists a set of DRC patterns that may be supported and provides parameters for each DRC pattern. Each DRC pattern may be assigned a different index and may be associated with a particular ON faction. Each DRC pattern may also be associated with a particular number of ON periods (M) and a particular number of OFF periods (N) in each DRC pattern cycle as well as a particular DRC pattern cycle length. The ON faction in the second column is equal to the number of ON periods in the third column divided by the DRC pattern cycle length in the fifth column.

TABLE 3

DRC Patterns

| DRC Pattern Index | ON Fraction | Number of ON Periods (M) in Each Cycle | Number of OFF Periods (N) in Each Cycle | DRC Pattern Cycle Length (M + N) |
|---|---|---|---|---|
| 0 | 0.0 | 0 | 1 | 1 |
| 1 | 0.1 | 1 | 9 | 10 |
| 2 | 0.2 | 1 | 4 | 5 |
| 3 | 0.3 | 3 | 7 | 10 |
| 4 | 0.4 | 2 | 3 | 5 |
| 5 | 0.5 | 3 | 3 | 6 |
| 6 | 0.6 | 3 | 2 | 5 |
| 7 | 0.75 | 3 | 1 | 4 |
| 8 | 0.8 | 4 | 1 | 5 |
| 9 | 0.9 | 9 | 1 | 10 |
| 10 | 1.0 | 1 | 0 | 1 |

Figure 4:
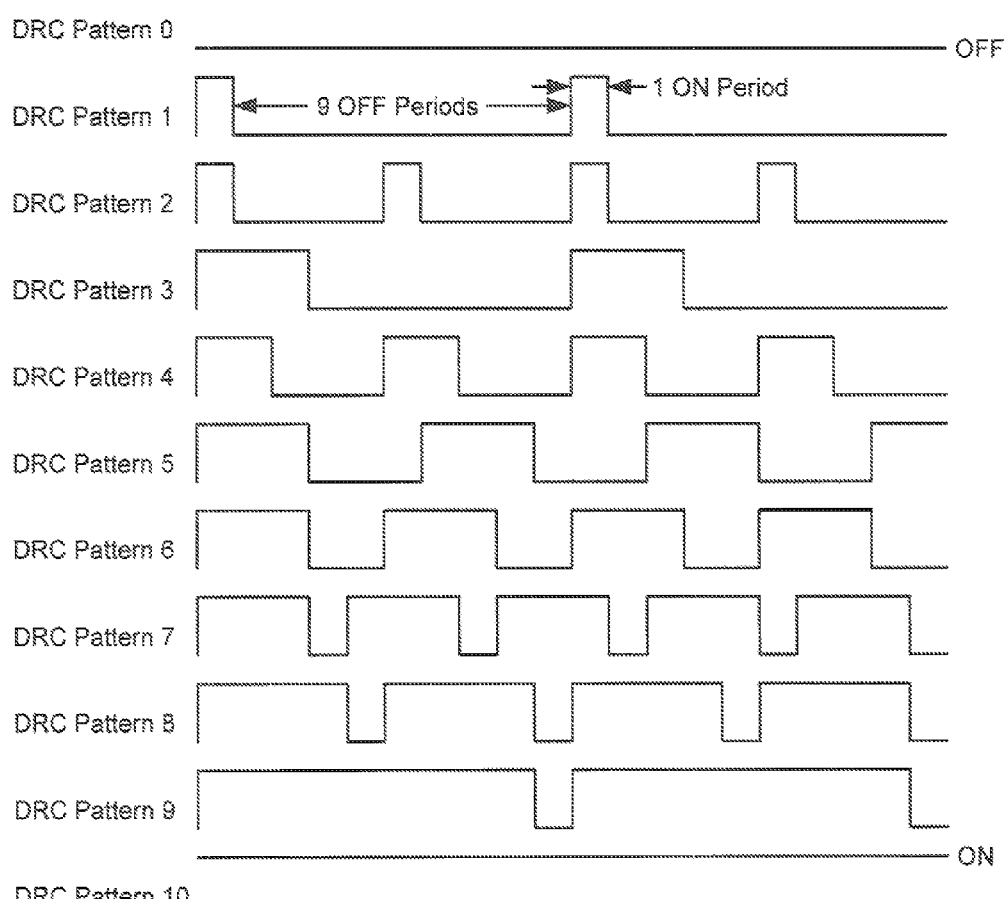
FIG. 4 shows a set of data rate control (DRC) patterns.

FIG. 4 shows the set of DRC patterns listed in Table 3. For each DRC pattern, a cycle of that DRC pattern includes M ON periods followed by N OFF periods, where M and N are given in the third and fourth columns, respectively, of Table 3. The cycle length of each DRC pattern is equal to M+N and is given in the fifth column of Table 3.

An ON period may cover a time interval in which one or more DRC messages with non-zero rates are sent. An OFF period may cover a time interval in which one or more DRC null covers are sent. In one design, a time interval for an ON period or an OFF period may cover a DRC period, which may be configurable and may range from 1 to 8 slots. In this design, one DRC message may be sent in each ON or OFF period. In another design, a time interval for an ON period or an OFF period may cover the longest possible DRC period of 8 slots. In this design, multiple DRC messages may be sent in each ON or OFF period if the DRC period is less than 8 slots. The time interval for each ON or OFF period may also be defined in other manners.

Table 3 and FIG. 4 show a design of an exemplary set of DRC patterns that may be used for flow control to relieve resource congestion. This design includes a number of ON periods followed by a number of OFF periods to obtain the desired ON fraction for each DRC pattern. This design may simplify implementation of the DRC patterns. Starting each DRC pattern with the ON periods may avoid extension of the OFF periods when a switch to a new DRC pattern is made. In another design, the DRC patterns may be defined to have the same cycle length, e.g., of 10 periods. The OFF periods for each DRC pattern may then be distributed as evenly as possible across the 10 periods in a DRC cycle.

In general, any number of DRC patterns and any set of DRC patterns may be defined to obtain the desired granularity of the OFF fraction and to support EF flows with satisfactory quality. It may be desirable to limit the number of consecutive OFF periods in each DRC pattern so that transmission discontinuity does not cause packet drops in EF flows due to excessive latency. For example, a buffer may be able to absorb up to 80 ms (or 48 slots) of latency for a voice packet. The number of consecutive OFF periods in each DRC pattern may then be limited to less than 48 slots to avoid packet drops.

Various schemes may be defined to select DRC patterns for use to relieve resource congestion. These schemes may attempt to maximize resource usage while relieving congestion. Avoiding congestion may have higher priority than resource utilization when making a tradeoff between these two goals.

In a first scheme, flow control may be performed with one or more of the following characteristics:

Bandwidth reduction on the forward link should leave sufficient bandwidth for EF flows, which are not delay tolerant. Each DRC pattern selected for use should have enough bandwidth to serve all EF flows. Sufficient bandwidth may be ensured by (i) mapping the requirements of the EF flows to a DRC pattern with the smallest ON fraction that can meet the requirements (which may be referred to as the lowest DRC pattern) and (ii) selecting the lowest DRC pattern or a DRC pattern with a higher ON fraction for use.

When congestion is first detected, the lowest DRC pattern may be selected in order to quickly relieve congestion. When congestion is thereafter detected, bandwidth may be reduced stepwise, e.g., by one DRC pattern at a time.

Bandwidth may be increased stepwise, e.g., by one DRC pattern at a time, when it is allowed to increase. Stepwise increase in bandwidth may avoid overshooting, which may increase the frequency of congestion.

In general, the lowest DRC pattern may be selected based on bandwidth and/or delay requirements of all data flows of interest and possibly at least one Transmission Control Protocol (TCP) packet that may be sent and acknowledged before TCP timeout occurs. For example, if any EF flows are present, then the lowest DRC pattern should have an ON fraction of 20% or higher for the example shown in Table 3 and FIG. 4. This is because the DRC pattern with 10% ON fraction has nine consecutive OFF periods, which may exceed the delay bound of the EF flows.

Figure 5:
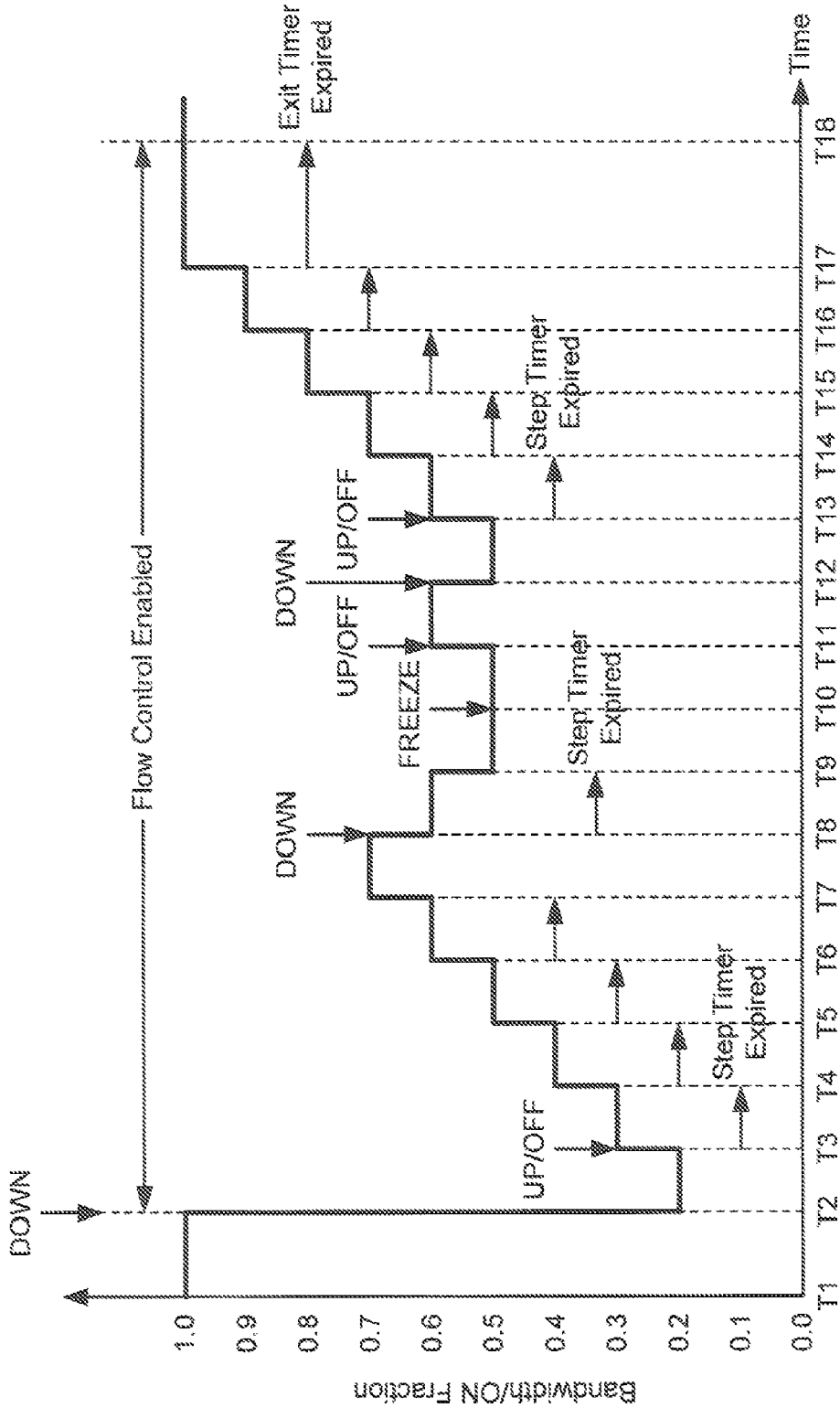
FIG. 5 shows a design of selecting DRC pattern for flow control.

FIG. 5 illustrates the first scheme for selecting DRC pattern for flow control. Initially, at time T1, the DRC pattern with 100% ON fraction (i.e., without any DRC null covers) may be selected for use. At time T2, congestion is detected (e.g., the first DOWN command is received), flow control is triggered, and the lowest DRC pattern is selected for use. Data transmission to wireless device 110 may be inhibited during OFF periods of the selected DRC pattern. The amount of data sent to wireless device 110 for BE flows may be decreased, and the required CPU and memory resources may be reduced due to the OFF periods.

A time T3, congestion is no longer detected (e.g., an UP or an OFF command is received), and the DRC pattern with the next higher ON fraction is selected. In one design, another DRC pattern with the next higher ON fraction may be selected if (i) congestion is not detected (e.g., a DOWN command is not received) within a predetermined amount of time, which may be referred to as a step timer period, and (ii) the DRC pattern with 100% ON fraction is not selected. The step timer period may be about 250 ms or some other duration. In the example shown in FIG. 5, DRC patterns with progressively higher ON fractions may be selected at times T4, T5, T6 and T7, after each step timer period.

At time T8, another DOWN command is received, and the DRC pattern with the next lower ON fraction is selected. In one design, another DRC pattern with the next lower ON fraction may be selected if (i) congestion is detected (e.g., a DOWN is received) within the step timer period when flow control is enabled and (ii) the lowest DRC pattern is not selected. In the example shown in FIG. 5, DRC patterns with progressively lower ON fractions may be selected at time T9, after the step timer period.

At time T10, a FREEZE command is received, and the DRC pattern is maintained. At time T11, an UP or an OFF command is received, and the DRC pattern with the next higher ON fraction is selected. At time T12, a DOWN command is received, and the DRC pattern with the next lower ON fraction is selected. At time T13, an UP or an OFF command is received, and the DRC pattern with the next higher ON fraction is selected. DRC patterns with progressively higher ON fractions may be selected at times T14, T15, T16 and T17, after each step timer period in which a DOWN command is not received. At time T18, after an exit timer period, flow control is disabled, and the DRC pattern with 100% ON fraction is used from this point onward until congestion is detected again.

In another design, a DRC pattern may be selected based on the severity of detected congestion. DRC patterns with progressively lower ON fractions may be selected for progressively more severe congestion.

The forward link bandwidth may be dependent on the ON fraction. The forward link bandwidth with the selected DRC pattern should be higher than the required bandwidth for active QoS flows in order to maintain QoS requirements. The required bandwidth may be about 10 kbps for VoIP or VT audio and may be about 64 kbps for VT video. The lowest non-zero data rate supported on the forward link may be 38.4 kbps. A requested data rate may be determined based on an average of the data rates in DRC messages sent during the ON periods. The requested data rate may be compared against a required data rate for the QoS flows. If the requested data rate is lower than the required data rate, then higher data rates may be sent in DRC messages and/or another DRC pattern with a higher ON fraction may be selected.

In a second scheme, flow control may be performed to maintain resource usage near a target level. For this scheme, a resource monitor may report resource usage in finer resolution than the four indications shown in FIG. 4. The resource monitor may report resource usage periodically, or periodically once resource usage exceeds a high threshold, or based on some other reporting configuration.

Resource manager 210 may receive reports from the resource monitor and may attempt to maintain resource usage close to the target level. In one design, upon receiving the first report with resource usage exceeding the high threshold, flow control may be enabled, and the lowest DRC pattern may be selected for use. Thereafter, for each subsequent report, resource usage from the report may be compared against the target level. If resource usage is less than the target level, then a DRC pattern with the next larger ON fraction may be selected to increase bandwidth. Conversely, if resource usage is greater than the target level, then a DRC pattern with the next smaller ON fraction may be selected to decrease bandwidth. The selected DRC pattern may be constrained to be between the lowest DRC pattern and the highest DRC pattern with 100% ON fraction. If the selected DRC pattern is the highest DRC pattern for the exit timer period, then flow control may be disabled.

The second scheme may be able to maintain resource usage close to the target level. The second scheme may also avoid or minimize ping-ponging in and out of congestion since resource usage may be reported with finer resolution.

Flow control based on DRC messages may provide certain advantages. First, flow control may be performed such that the performance of QoS flows can be maintained even when congestion is detected. This may be achieved by selecting a DRC pattern with a sufficient ON fraction and suitably spaced ON periods. Second, flow control may be performed in a rapid manner by using messages at Layer 1 or Layer 2 (which have relatively short signaling delay) instead of messages at Layer 3 (which may have longer signaling delay). Layer 1 may be physical layer, Layer 2 may be Medium Access Control (MAC) layer, and Layer 3 may be RLC layer.

Wireless device 110 may support operation on multiple carriers. Each carrier may be defined by a particular bandwidth and a particular center frequency. Wireless device 110 may operate on a single carrier to send or receive data for one or more data flows. Wireless device 110 may also operate on multiple carriers to increase the overall data rate for data transmission.

Congestion may be relieved in various manners when operating on multiple carriers. In one design, a DRC pattern may be selected (e.g., based on the first or second scheme described above) when congestion is detected (e.g., when a first DOWN command is received or when resource usage exceeds a high threshold for the first time). This DRC pattern may be applied to each carrier. The ON fraction of all carriers may be reduced by the same amount to relieve congestion.

In another design, which may be referred to as carrier suppression, one or more carriers may be dropped when congestion is detected. In one design of carrier suppression, all carriers except one may be dropped when congestion is detected. This design may relieve congestion as quickly as possible. In another design of carrier suppression, one carrier may be dropped at a time when congestion is detected. For both designs, if congestion is not relieved by going from multiple carriers to one carrier, then a DRC pattern may be selected to further reduce congestion. Carriers may also be restored in various manners when congestion is no longer detected. In one design, one carrier may be restored at a time when congestion is not detected. In another design, one or more carriers may be restored based on resource usage. For example, one carrier may be restored when an UP command is received, and all carriers may be restored when an OFF command is received. Carrier suppression may result in lower jitter for EF flows since one carrier may be retained all or most of the time even during congestion, and this carrier may be able to serve the EF flows without introducing discontinuity.

Figure 6:
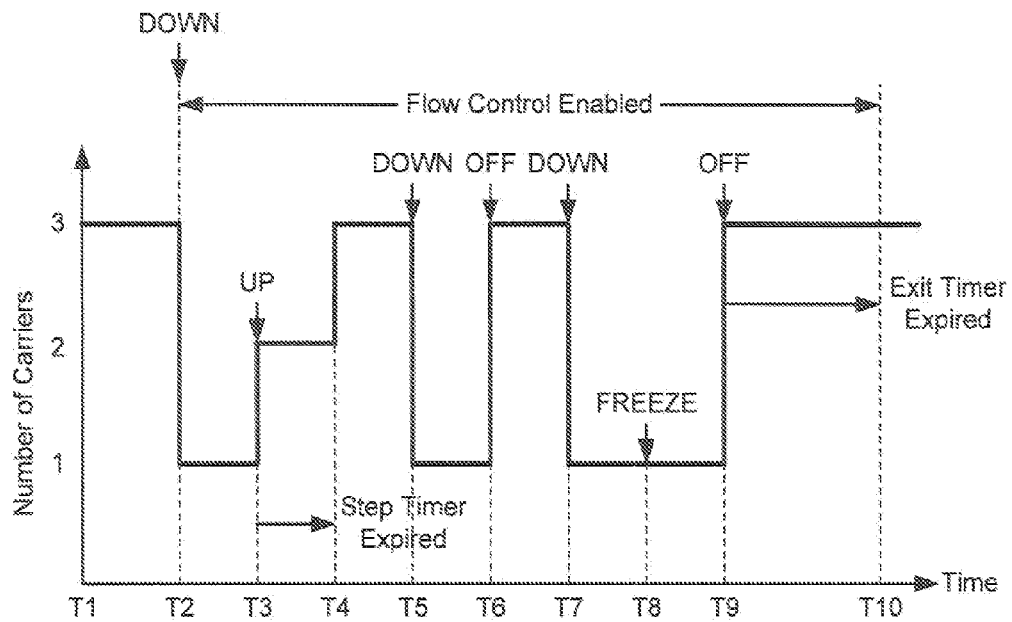
FIG. 6 shows a design of performing flow control for multiple carriers.

FIG. 6 shows a design of performing flow control for multiple carriers. Initially, at time T1, wireless device 110 may operate on three carriers and may use the DRC pattern with 100% ON fraction for each carrier. At time T2, congestion is detected (e.g., the first DOWN command is received), flow control is triggered, two carriers are dropped, and one carrier is maintained. A carrier may be dropped by selecting the DRC pattern with 0% ON fraction for that carrier. If possible, a carrier with one or more QoS flows may be retained, and the other carriers may be dropped. If QoS flows are sent on more than one carrier and possibly mixed with BE flows, then the carrier that supports the largest fraction of the QoS flows may be retained in order to reduce packet losses due to carrier suppression.

A time T3, congestion is no longer detected (e.g., an UP or an OFF command is received), and one dropped carrier may be restored. This may be achieved by selecting the DRC pattern with 100% ON fraction for the carrier to be restored. At time T4, if congestion is not detected after a step timer period, then the other dropped carrier may be restored.

At time T5, congestion is again detected (e.g., another DOWN command is received), two carriers are again dropped, and one carrier is maintained. At time T6, an OFF command is received, and both dropped carriers are restored. At time T7, congestion is again detected, two carriers are dropped, and one carrier is maintained. At time T8, a FREEZE command is received, and the one carrier is maintained. At time T9, an OFF command is received, and both dropped carriers are restored. At time T10, after an exit timer period has expired with all three carriers restored, flow control is disabled.

In the design shown in FIG. 6, all carriers except one may be dropped when congestion is detected (e.g., when a DOWN command is received). All dropped carriers may be restored when an OFF command is received, and one carrier may be restored when an UP command is received. The step timer may be started when an UP command is received and all dropped carriers have not been restored. Another carrier may be restored when the step timer expires. Once all carriers have been restored, the exit timer may be started, and flow control may be disabled when the exit timer expires.

For clarity, FIG. 6 shows congestion being relieved by dropping carriers, without having to change DRC patterns to reduce the ON fraction. If all but one carrier is dropped and congestion persists, then flow control may be performed on this one carrier by changing DRC pattern, e.g., as shown in FIG. 5.

Figure 7:
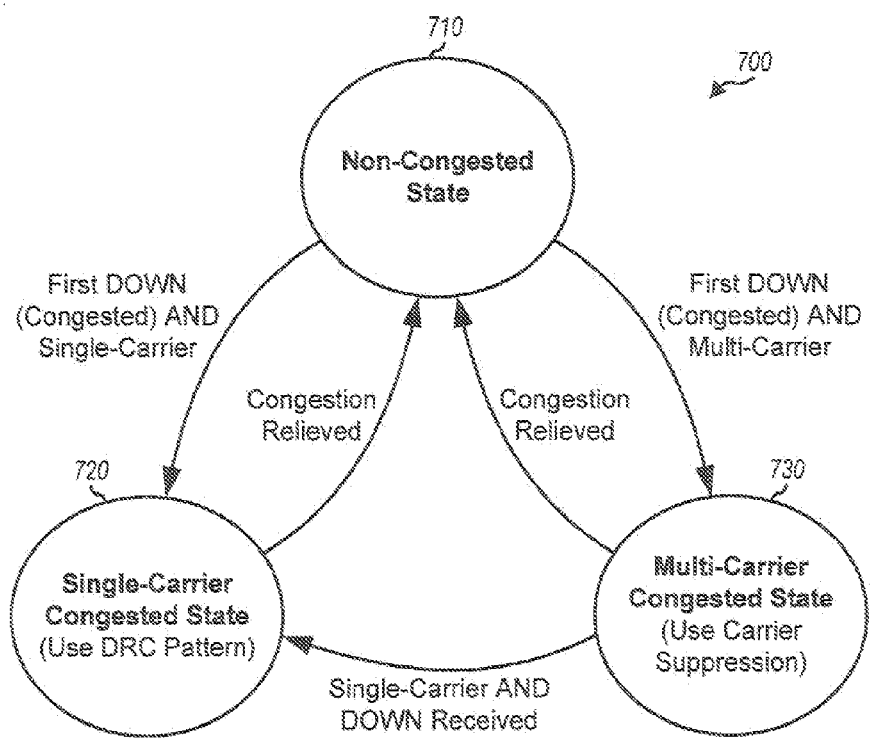
FIG. 7 shows a state diagram for performing flow control.

FIG. 7 shows a state diagram of a design of a process 700 for performing flow control for one or multiple carriers. Initially, wireless device 110 may operate in a non-congested state 710, e.g., when communication is first established. In state 710, wireless device 110 may operate on one or more carriers and may use the DRC pattern with 100% ON fraction for each carrier.

If wireless device 110 is operating on one carrier and congestion is detected (e.g., the first DOWN command is received or resource usage exceeds a high threshold for the first time), then wireless device 110 may transition from state 710 to a single-carrier congested state 720 and may change the DRC pattern for the carrier. Wireless device 110 may select the DRC pattern based on the first or second scheme described above or some other scheme. If congestion is relieved, then wireless device 110 may return to non-congested state 710.

If wireless device 110 is operating on multiple carriers and congestion is detected, then wireless device 110 may transition from state 710 to a multi-carrier congested state 730 and may perform carrier suppression. Wireless device 110 may drop one or more carriers based on the design shown in FIG. 6 or some other design. If congestion persists after dropping down to one carrier, then wireless device 110 may transition to single-carrier congested state 720 and may change the DRC pattern for this one carrier to relieve congestion. Otherwise, if congestion is relieved while in state 730, then wireless device 110 may return to non-congested state 710.

FIG. 8 shows a design of a process 800 for managing resources on a wireless device. Congestion of resources on the wireless device may be detected (block 812). The resources on the wireless device may include CPU resources, memory resources, bus resources, power resources, some other resources, or a combination thereof. In one design, usage reports for different resource may be received, e.g., periodically, or when triggered by occurrence of predetermined events, or when requested, or based on a combination thereof. Congestion of resources may then be detected based on the usage reports. For example, CPU resources may be deemed to be congested if usage of a processor exceeds a high CPU threshold. Memory resources may be deemed to be congested if usage of a memory exceeds a high memory threshold. Congestion of other resources may also be detected in similar manner.

Congestion of congested resources may be relieved by controlling utilization of the congested resources by at least one client (block 814). The at least one client may comprise a client (e.g., a forward link flow controller) for at least one data flow and/or other clients for other functions at the wireless device. In one design of block 814, the bandwidth of data transmission may be reduced to relieve congestion of the congested resources. For example, a target bandwidth for the at least one data flow may be determined to relieve congestion of the congested resources. Data for the at least one data flow may then be exchanged (e.g., transmitted or received) based on the target bandwidth.

FIG. 9 shows a design of a process 900 for performing flow control to relieve congestion of congested resources. Process 900 may be used for block 814 in FIG. 8. In the design shown in FIG. 9, flow control may be performed for at least one data flow to relieve congestion of congested resources (block 912).

In one design, a pattern indicative of when to send messages enabling data transmission and when to send messages disabling data transmission may be selected (block 914). The messages may be Layer 1 or Layer 2 messages, e.g., DRC messages in HRPD. The pattern may have a particular ON fraction, which may be determined based on the ratio of messages enabling data transmission to all messages covered by the pattern. A plurality of patterns associated with different ON fractions may be supported. The pattern may be selected from among the plurality of patterns.

Messages may be sent in accordance with the selected pattern to control transmission of data for the at least one data flow (block 916). Each message may enable or disable data transmission for the at least one data flow. The percentage of messages enabling data transmission may be determined based on bandwidth requirements of data flows having QoS requirements among the at least one data flow. The messages enabling data transmission may be spaced closer than latency requirements of the at least one data flow.

In one design, usage of the congested resources with the pattern being applied may be determined (block 918). Another pattern with a higher ON fraction or a lower ON fraction may be selected based on the usage of the congested resources (block 920). For a congestion-based design, a pattern with a next lower ON fraction may be selected if usage of the congested resources is greater than a high threshold, and a pattern with a next higher ON fraction may be selected if usage of the congested resources is less than a low threshold. For a target-based design, a pattern with a next lower ON fraction may be selected if usage of the congested resources is greater than a target level, and a pattern with a next higher ON fraction may be selected if usage of the congested resources is less than the target level. Different patterns may also be selected in other manners.

If multiple carriers are supported, then at least one carrier used for data transmission may be dropped to relieve congestion of the congested resources. The at least one carrier may be restored if usage of the congested resources is below a threshold.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of managing resources on a wireless device, comprising:
    detecting, by a processor, for congestion of resources on the wireless device; and
    in response to detecting a congested resource on the wireless device utilizing a data flow, reducing the data flow by causing the wireless device to transmit a DRC (Data Rate Control) pattern selected from a plurality of DRC patterns, each DRC pattern having a corresponding ON fraction, where an ON fraction for a particular DRC pattern is a ratio of a number of a number of ON periods in the particular DRC pattern to a sum of the number of ON periods and a number of OFF periods in the particular DRC pattern, wherein ON period is a time interval for which one or more non-zero rate DRC messages are transmitted, and an OFF period is a time interval in which one or more zero rate DRC messages are transmitted.

2. The method of claim 1, wherein the resources on the wireless device comprise central processing unit (CPU) resources, or memory resources, or bus resources, or power resources, or a combination thereof.

3. The method of claim 2, wherein the detecting for congestion comprises declaring congestion of the CPU resources if usage of a processor exceeds a high threshold.

4. The method of claim 1, wherein the reducing the data flow by causing the wireless device to transmit a DRC (Data Rate Control) pattern comprises sending messages at Layer 1 or Layer 2 to control transmission of data for the one data flow.

5. The method of claim 1, wherein a portion of the DRC pattern enabling data transmission is determined based on bandwidth and QoS (Quality of Service) requirements of the data flow.

6. The method of claim 5, wherein the messages of the DRC pattern enabling data transmission are spaced closer than latency requirements of the data flow.

7. The method of claim 1, wherein the reducing the data flow by causing the wireless device to transmit a DRC (Data Rate Control) pattern further comprises
    determining usage of the congested resource, and
    selecting another DRC pattern with a higher ON fraction or a lower ON fraction than the DRC pattern based on the usage of the congested resource.

8. The method of claim 6, further comprising:
    selecting the another DRC pattern to have a next lower ON fraction if usage of the congested resource is greater than a high threshold, and
    selecting the another DRC pattern to have a next higher ON fraction if usage of the congested resource is less than a low threshold.

9. The method of claim 1, dropping at least one carrier used for data transmission to relieve congestion of the congested resource if more than one carrier is in use.

10. The method of claim 7, further comprising:
restoring the at least one carrier if usage of the congested resource is below a threshold.

11. The method of claim 1, wherein the detecting for congestion comprises
receiving usage reports for the resources on the wireless device, and
detecting for congestion of the resources based on the usage reports.

12. The method of claim 11, wherein the usage reports are sent periodically, or when triggered by occurrence of predetermined events, or when requested, or based on a combination thereof.

13. An apparatus for managing resources, comprising:
means for detecting for congestion of resources on a wireless device; and
means for reducing a data flow associated with a congested resource by causing the wireless device to transmit a DRC (Data Rate Control) pattern selected from a plurality of DRC patterns, each DRC pattern having a corresponding ON fraction, where an ON fraction for a particular DRC pattern is a ratio of a number of ON periods in the particular DRC pattern to a sum of the number of ON periods and a number of OFF periods in the particular DRC pattern, wherein an ON period is a time interval for which one or more non-zero rate DRC messages are transmitted, and an OFF period is a time interval in which one or more zero rate DRC messages are transmitted.

14. The apparatus of claim 13, further comprising:
means for selecting the DRC pattern to have a next lower ON fraction if usage of the congested resource is greater than a high threshold, and
means for selecting the DRC pattern to have a next higher ON fraction if usage of the congested resource is less than a low threshold.

15. The apparatus of claim 14, further comprising:
means for selecting the DRC pattern to have a next lower ON fraction if usage of the congested resource is greater than a target level, and
means for selecting the DRC pattern to have a next higher ON fraction if usage of the congested resource is less than the target level.

16. The apparatus of claim 13, wherein the means for reducing the data comprises means for dropping at least one carrier used for data transmission to relieve congestion of the congested resource provided more than one carrier is used.

17. An apparatus for wireless communication, comprising:
at least one processor configured to detect for congestion of resources on a wireless device, and to reduce a data flow associated with a congested resource by causing the wireless device to transmit a DRC (Data Rate Control) pattern selected from a plurality of DRC patterns, each DRC pattern having a corresponding ON fraction, where an ON fraction for a particular DRC pattern is a ratio of a number of ON periods in the particular DRC pattern to a sum of the number of ON periods and a number of OFF periods in the particular DRC pattern, wherein an ON period is a time interval for which one or more non-zero rate DRC messages are transmitted, and an OFF period is a time interval in which one or more zero rate DRC messages are transmitted.

18. The apparatus of claim 17, wherein the at least one processor is configured to select the DRC pattern to have a next lower ON fraction if usage of the congested resource is greater than a high threshold, and to select the DRC pattern to have a next higher ON fraction if usage of the congested resource is less than a low threshold.

19. The apparatus of claim 18, wherein the at least one processor is configured to select the DRC pattern to have a next lower ON fraction if usage of the congested resource is greater than a target level, and to select the DRC pattern to have a next higher ON fraction if usage of the congested resource is less than the target level.

20. The apparatus of claim 17, wherein the at least one processor is configured to drop at least one carrier used for data transmission to relieve congestion of the congested resources.

21. A computer program product, comprising:
a computer-readable medium comprising:
code for causing at least one processor to detect for congestion of resources on a wireless device, and
code for causing the at least one processor to reduce a data flow associated with a congested resource by causing the wireless device to transmit a DRC (Data Rate Control) pattern selected from a plurality of DRC patterns, each DRC pattern having a corresponding ON fraction, where an ON fraction for a particular DRC pattern is a ratio of a number of ON periods in the particular DRC pattern to a sum of the number of ON periods and a number of OFF periods in the particular DRC pattern, wherein an ON period is a time interval for which one or more non-zero rate DRC messages are transmitted, and an OFF period is a time interval in which one or more zero rate DRC messages are transmitted.

* * * * *